(12) United States Patent
Mashima

(10) Patent No.: US 6,441,977 B1
(45) Date of Patent: Aug. 27, 2002

(54) OPTICAL APPARATUS WITH OPTICAL SYSTEM HAVING LONG OPTICAL PATH

(75) Inventor: Hiroshi Mashima, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/370,697

(22) Filed: Aug. 9, 1999

(30) Foreign Application Priority Data

Aug. 10, 1998 (JP) .......................................... 10-225861

(51) Int. Cl.$^7$ ................................................. G02B 5/04
(52) U.S. Cl. ........................................ 359/831; 396/384
(58) Field of Search ................................. 359/831, 833, 359/834, 835, 836; 396/296, 384, 386

(56) References Cited

U.S. PATENT DOCUMENTS

| | | | | |
|---|---|---|---|---|
| 5,034,764 A | * | 7/1991 | Inabata | 354/223 |
| 5,581,318 A | * | 12/1996 | Shiratori | 396/296 |
| 5,801,882 A | * | 9/1998 | Miyauchi | 359/431 |
| 5,903,788 A | * | 5/1999 | Mukai et al. | 396/373 |
| 6,058,273 A | * | 5/2000 | Abe | 396/384 |
| 6,122,080 A | * | 9/2000 | Ogata | 359/15 |

FOREIGN PATENT DOCUMENTS

| | | |
|---|---|---|
| JP | 05187832 | 7/1993 |
| JP | 08297203 | 11/1996 |

* cited by examiner

Primary Examiner—Cassandra Spyrou
Assistant Examiner—Euncha Cherry
(74) Attorney, Agent, or Firm—Sidley Austin Brown & Wood LLP

(57) ABSTRACT

An appartus, such as a binocular telescope, with an optical system which includes a long optical path. The binocular telescope includes a first objective lens, a second objective lens, a first prism, a second prism, and a group of eye piece lenses. A body of the second prism has an outer surface on which a film made of aluminum is deposited. A light which passes through the first objective lens is firstly reflected by an outer surface, or an exposed side, of the deposited film, and then reflected by an inner surface, or a side contacting the body of the second prism, of the film after the light passes through the second objective lens, the first prism and the second prism. The light reflected by the inner surface of the film is projected outside through the second prism and the eye piece lenses. The single deposited film serves as a pair of reflection elements within the optical system, so that the long optical path is secured therein.

20 Claims, 12 Drawing Sheets ft,fs,fr : focal length
δ : diameter, of permissible circle of coufusion, on a film
D : distance to object
L : distance to front depth of field
dL: width of depth of field
B : base length between a projecting optical system and a receiving optical system
dx: permissible width of detect on a photosensor
φ : diameter of entrance pupil

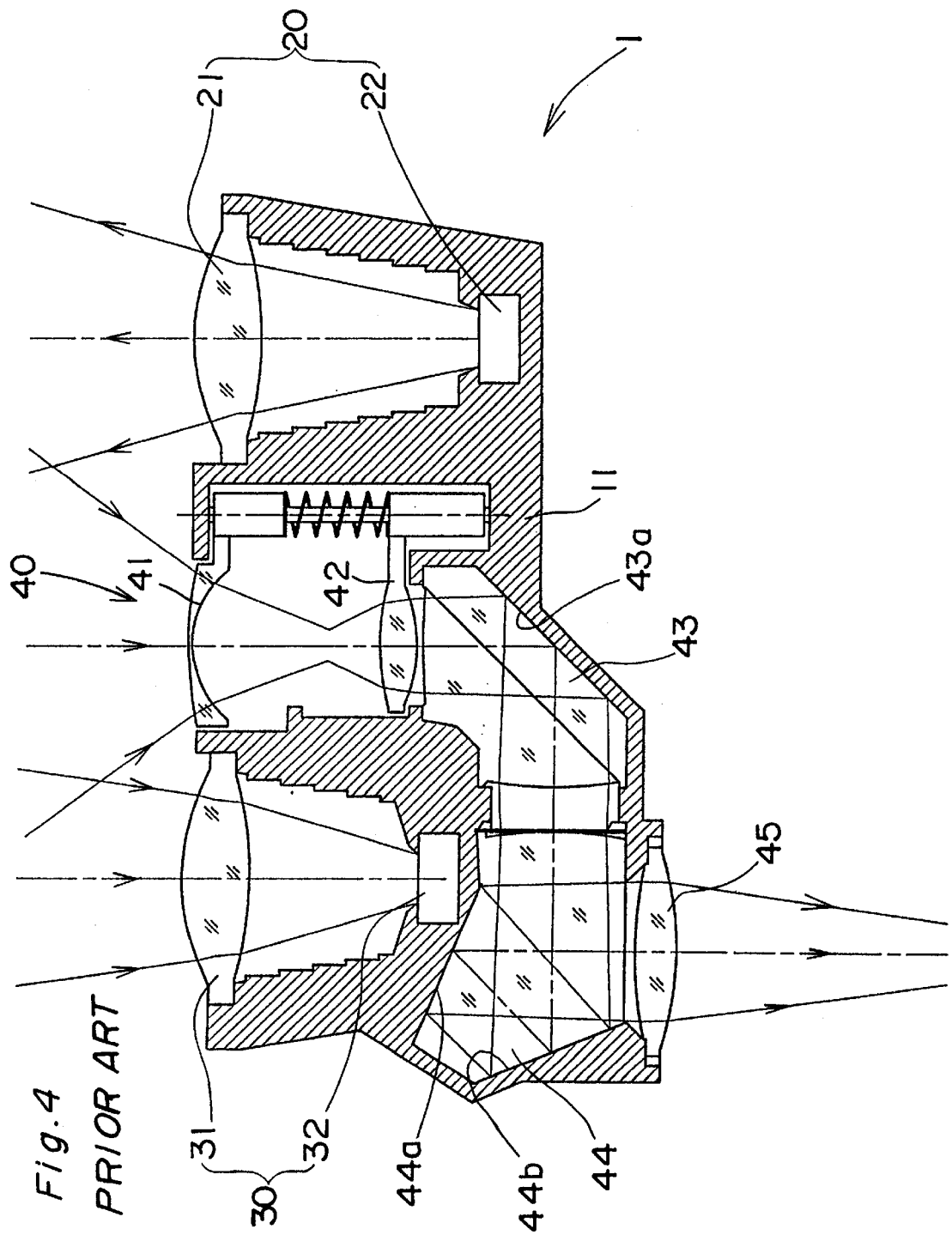

OPTICAL APPARATUS WITH OPTICAL SYSTEM HAVING LONG OPTICAL PATH

This application is based on an application No. 10-225861 filed in Japan, the contents of which are hereby incorporated by reference.

BACKGROUND OF THE INVENTION

1. Field of the Invention

The present invention relates to an optical apparatus such as a camera, and particularly relates to an optical system thereof which has a lens, a prism, and the like.

2. Description of the Related Art

Accompanying a miniaturization (or compactness, or thinnerization) of cameras which have been provided in recent years, there has been a tendency that a length in a direction of optical axis in an optical unit also becomes short. Under this tendency, it becomes difficult to arrange a light projecting/receiving optical system of an active AF, or an AE optical system, with a sufficient focal length. If the focal length of each of these optical systems is made relatively shorter, undesirable influences, such as a deterioration of precision in AF focussing, a difficulty in AE spot photometric measuring, and the like, may be brought to a camera performance.

Firstly, a description is made below upon the deterioration, or lowering, of precision in the AF focussing.

FIG. 1 is a view showing an optical relation among a photographing optical system, a light projecting lens (or a light emitting lens), a light receiving lens, and so on, of a camera which employs an active AF as a focussing device. An AF beam emitted from a light projecting element (or a light emitting element) such as a LED, is reflected on an object (i.e. a subject to be photographed), and then is projected, or incident, upon a light receiving surface of a photo sensor (or a light receiving element) such as a PSD. Therefore, it is possible to know a position of center of gravity of light distributed over the light receiving surface, such as a distance from a left edge of the photo sensor to the position of center thereof. Therefore, if a relation between the position of center thereof and a distance "D" up to the object to be photographed (i.e. a distance "D" between the object and the camera) is tabled, or memorized, beforehand, it is possible to calculate the distance "D" up to the object. Alternatively, if a formula which represents a relation between the position of center thereof and the distance "D" up to the object, it is also possible to calculate the distance "D" up to the object by calculation, or operation, due to the position of center thereof.

The aforementioned table or formula is prepared on the assumption that all the projected AF beam returns to the photo sensor. That is, in order to accurately measure the distance with the aforementioned manner, it is necessary that all the projected AF beam returns to the photo sensor. FIG. 2B shows a situation in which the AF beam is all projected on the object. That is, the horizontally elongate and shaded region in FIG. 2B shows a region on the object in which the AF beam is projected. In this case, all the projected AF beam is reflected on the object, and it is possible to measure the distance (i.e. to focus) up to the object with high accuracy.

Meanwhile, in FIG. 2A, only a part of the projected, or emitted, AF beam can hit the object. In this case, what reflects on the object is not all of the projected, or emitted, AF beam (hereinafter, this phenomenon is referred to as "partial reflection" or "vignette (or vignetting)"), and the accuracy of the distance measuring is naturally lowered or reduced. The degree of error of the distance measuring becomes larger as the degree of the vignette increases.

Therefore, for the purpose of accurate distance measuring, it is preferable that there is no "partial reflection" at all. However, even if the "partial reflection", or "vignetting", occurs, and even if the actual location of the object and its focused location (namely, the distance up to the object measured by means of active AF) are not exactly coincide with each other as a result, the focussing error does not become a substantial problem as far as the object exists within a depth of field relative to the location thus focussed.

Referring to FIG. 1, it can be understood that if the depth of field is "dL", the width "dX" of the region on the photo sensor corresponding to the depth of field can be determined geometrically. Even if the center location of the light distributed on the photo sensor is deviated due to the "partial reflection", the deviation is not a substantial problem as far as it exists within the region "dX". Therefore, supposing that the resolution of the photo sensor is fixed or constant, the wider the "dX" becomes, the higher the accuracy of the distance measuring becomes substantially. As explained below, the "dX" can be represented by a formula including the focal length "fr" of the receiving lens.

Generally, the following "FORMULA 1" is established between a permissible circle of confusion (or a permissible derangement circle) and a depth of field, where the "$F_{no}$" is a f-number of the photographing optical system, and the "n" is a permissible coefficient which can be determined optionally in compliance with a specific design (the "n" can be 0.333, for example).

$$1/L - 1/(L+dL) = n \cdot F_{no} \cdot \sigma / ft^2 \qquad \text{(FORMULA 1)}$$

On the other hand, from the geometrical relationship shown in FIG. 1, the following "FORMULA 2", "FORMULA 3" and "FORMULA 4" are established.

$$(L+dL):B = fr:X_1 \qquad \text{(FORMULA 2)}$$

$$L:B = fr:X_2 \qquad \text{(FORMULA 3)}$$

$$dx = X_2 - X_1 \qquad \text{(FORMULA 4)}$$

Elimination of $X_1$ and $X_2$ from the "FORMULA 4", using the "FORMULA 2" and "FORMULA 3", brings a "FORMULA 5", as follows.

$$dx = \qquad \text{(FORMULA 5)}$$
$$B \cdot fr/L - B \cdot fr/(L+dL) = B \cdot fr \cdot \{1/L - 1/(L+dL)\}$$

Finally, substitution of the "FORMULA 1" into the "FORMULA 5" brings a "FORMULA 6" as follows.

$$dx = (n \cdot F_{no} \cdot \sigma \cdot B \cdot fr)/ft^2 \qquad \text{(FORMULA 6)}$$

By the way, in the case that the photographing optical system is a zoom lens which is constituted by a pair of lens groups, the diameter of entrance pupil φ does not change, even if the magnification is changed by zooming. Therefore, using a relationship $F_{no}=ft/\phi$, the "FORMULA 6" can also be expressed as a "FORMULA 7" as follows.

$$dx = (n \cdot \sigma \cdot B \cdot fr)/ft \cdot \phi \quad \text{(FORMULA 7)}$$

From the "FORMULA 6" and "FORMULA 7", it can be understood that the "dx" is proportional to "fr". That is, it can be understood that the longer the focal length "fr" of the light receiving lens becomes, the higher the accuracy of the distance measuring (i.e. the accuracy of focussing) becomes.

As to the focal length "fs" of the light projecting lens, the longer "fs" becomes, the higher the accuracy of the distance measuring becomes. Next, an explanation thereof is made below.

That is, the shorter the focal length "fs" of the light projecting lens becomes, the projected, or emitted, AF beam diverges from the projecting lens or element with a relatively wider angle. As a result, the beam projected area on the object also becomes relatively larger, supposing that the distance to the object is fixed. FIGS. 3A and 3B show this situation explanatorily.

Namely, FIG. 3B illustrates a situation in which the focal length of the light projecting lens is relatively longer; therefore, the beam projected area is relatively smaller. On the other hand, FIG. 3A illustrates a situation in which the focal length of the light projecting lens is relatively shorter; therefore, the beam projected area is relatively larger.

As apparent from FIGS. 3A and 3B, if the beam projected area relative to the object is relatively larger, there increases the possibility that the aforementioned "partial reflection" occurs, so that the accuracy of the distance measuring becomes lower. In other words, the light projecting lens is superior in the accuracy of the distance measuring if the focal length is relatively longer, similar to the light receiving lens which is superior in the accuracy of the distance measuring if the focal length is relatively longer.

Next, an explanation is made below upon a spot photometry (or spot photometric measurement).

That is, the spot photometric measurement is a photometric measurement in which an attention is paid to a specified narrow field of a photographing region. Therefore, it is necessary that the focal length of the AE photometric optical system is relatively long. Further, under a recent tendency in which the zoom lens has a high zooming rate, it is necessary to secure a longer focal length in the AE optical system in order to perform the spot photometric measurement with a higher magnification than the focal length in the conventional AE optical system.

As explained above, it is preferable that each optical system arranged in the optical apparatuses such as a camera has a longer focal length, in view of the accuracy of distance measuring and spot photometric measurement. However, the longer focal length in the optical system is contradictory to the necessity for thinnerization, or compactness, of cameras. Next, an explanation thereof is made below with reference to FIG. 4.

That is, FIG. 4 is a cross section showing a main part of an optical unit in a conventional camera. In the optical unit 1, a light projecting optical system (or a light emitting optical system) 20 and a light receiving optical system 30, of an active AF, are arranged on both sides of a unit body 11, and a finder optical system 40 is arranged therebetween.

The light projecting optical system 20 has a light projecting, or emitting, lens 21 and a light projecting, or emitting, element 22. The light receiving optical system 30 has a light receiving lens 31 and a photo sensor 32. The finder optical system 40 has a first objective lens 41, a second objective lens 42, a first prism 43, a second prism 44, and an eye piece (or an eye piece lens) 45.

In the conventional optical unit typically as shown in FIG. 4, the focal length of each of the light projecting optical system 20 and the light receiving optical system 30 of the active AF, can not be beyond the thickness of the unit body 11 at its maximum. Namely, an increase of the focal length thereof brings a large size of the optical unit (which in turn brings a large size of camera having the optical unit). The reason why it is difficult to prevent the conventional optical unit from becoming large-sized, is that the light travelling in each of the optical systems 20, 30 passes only in a straight direction without changing its direction therein.

On the other hand, paying attention to the finder optical system 40, it can be understood that the length of the optical path in the finder optical system 40 is much longer than the thickness of the unit body 11. The longer optical path length is attributed to an arrangement in which the light passing in the optical system 40 reflects on a plurality of reflecting surfaces 43a, 44a, 44b of the first and second prisms 43, 44, and changes its direction. In other words, utilizing the reflection thereby in the optical system brings such a longer optical path without increasing the thickness of the optical unit. However, if there is arranged an additional reflection member, such as a prism, in the light projecting optical system 20 and the light receiving optical system 30, it leads rather a large-sized apparatus.

It is to be noted that each surface for reflecting light of the prism arranged in the conventional finder optical system 40 shown in FIG. 4 has an aluminum deposited film by vacuum evaporation, as a reflection element, which is formed by depositing aluminum on an outside surface of a body of the prism. As shown in the figure, only one side of the aluminum deposited film (i.e. only an inner surface thereof contacting the body of the prism) is employed as a surface for reflecting light.

SUMMARY OF THE INVENTION

Therefore, it is an object of the present invention to provide an optical apparatus, such as a camera, having an optical system in which a relatively longer optical path is secured without hindering a thinnerization, or compactness, of the optical apparatus overall.

In order to accomplish the above object, according to one aspect of the present invention, there is provided an optical apparatus with a prism, the prism comprising: a first surface through which an incident light passes into a body of the prism; a second surface having an inner side by which the incident light is reflected into a reflection light within the body; and a third surface through which the reflection light is projected outside the body, wherein the prism is arranged such that an outer side of the second surface reflects light toward outside.

In the mechanism, the second surface may be provided with a reflection component. The reflection component, for example, may be a metal deposited film or layer, such as an aluminum film or layer, which is deposited on the body of the prism. Alternatively, the reflection component, for example, may be integrally formed with a part of the body of the prism.

According to the mechanism, each of the inner side and the outer side of a single surface (i.e. the second surface) is employed as a surface for reflecting light. Namely, there exist a pair of surfaces for reflecting light per single surface. Therefore, according to the mechanism, in contrast with the aforementioned conventional mechanism in which only the inner surface (i.e. inner side) of the reflection element is employed as a surface for reflecting light, and in which the outer surface (i.e. outer side) of the reflection element is not employed as a surface for reflecting light, it is possible to secure a longer optical path, relative to the same size of an optical unit. In other words, according to the mechanism of the one aspect of the present invention, if the length of optical path is the same in contrast with the conventional mechanism, the optical unit is miniaturized, or becomes compact, which in turn makes it possible to make the optical apparatus with the optical unit thinner or compact overall.

According to another aspect of the present invention, there is provided an optical apparatus with an optical element, the optical element comprising: a first surface having a first inner side and a first outer side; and a second surface having a second inner side and a second outer side, wherein an incident light which passes into a body of the optical element is reflected by the first inner side of the first surface and the second inner side of the second surface, into a reflection light which is projected outside the body, and wherein each of the first outer side of the first surface and the second outer side of the second surface reflects a light outside.

BRIEF DESCRIPTION OF THE DRAWINGS

This and other objects and features of the present invention will become clear from the following description taken in conjunction with the preferred embodiments thereof with reference to the accompanying drawings, in which:

FIG. 4 is a cross section of an optical unit of a conventional camera;

DETAILED DESCRIPTION OF THE PREFERRED EMBODIMENTS

Figure 1:
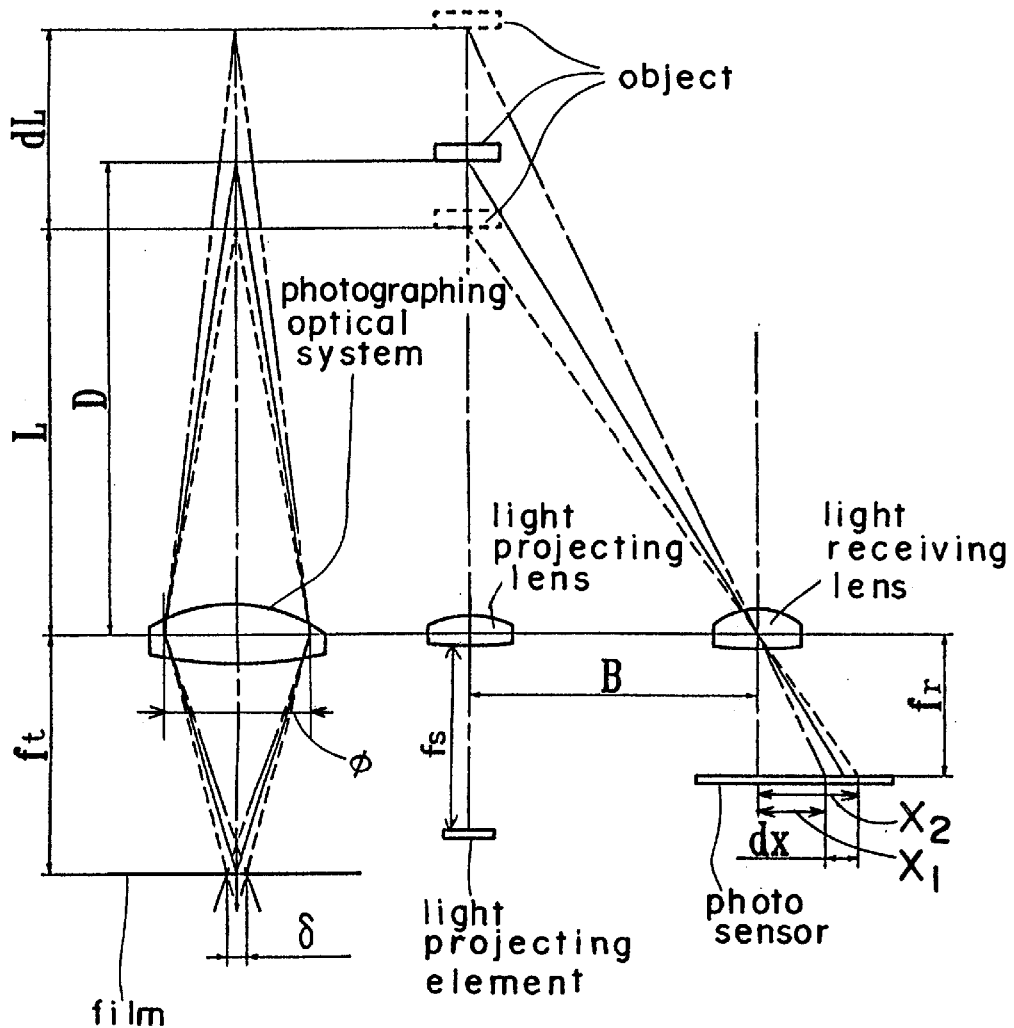
FIG. 1 is an explanatory view showing an optical relation of a camera which is equipped with an active AF.
Figure 2A:
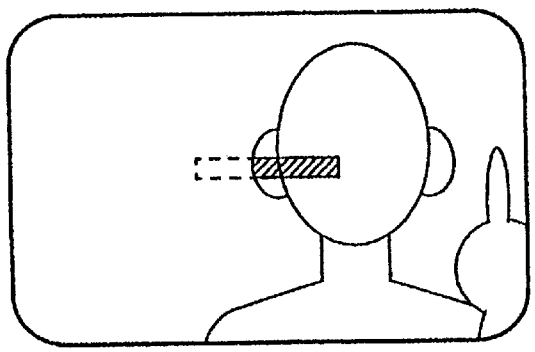
FIGS. 2A and 2B are explanatory views explaining a conception of "partial reflection (or vignette)" of an AF beam projected.
Figure 2B:
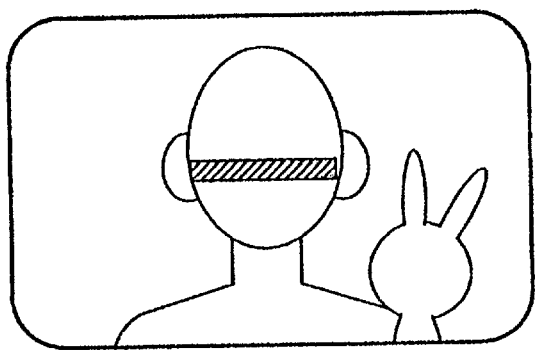
Figure 3A:
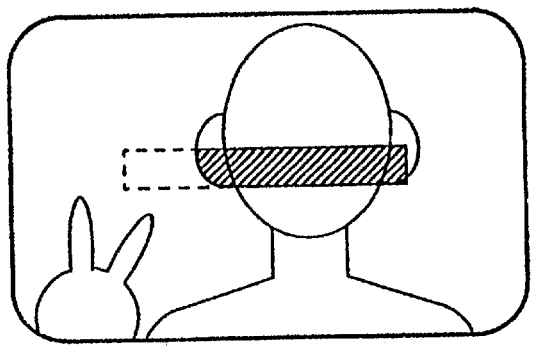
FIGS. 3A and 3B are explanatory views explaining a conception of "partial reflection (or vignette)" of an AF beam projected.
Figure 3B:
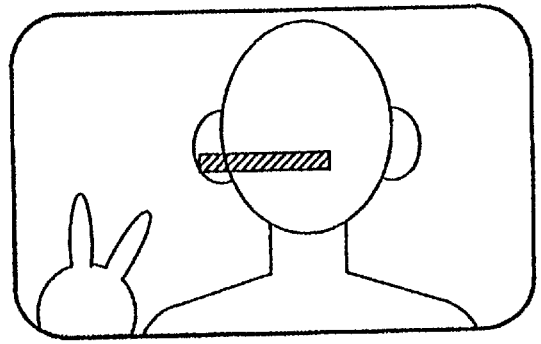

Before a description of the preferred embodiments proceeds, it is to be noted that like or corresponding parts are designated by like reference numerals throughout the accompanying drawings.

With reference to FIGS. 5 through 13, the description is made below upon a camera or a binocular telescope, as an optical apparatus, with an optical unit including at least one optical system, according to each of seven embodiments of the present invention.

First, with reference to FIGS. 5 through 7, the description is made below upon the camera with the optical unit according to a first embodiment of the present invention.

Figure 5:
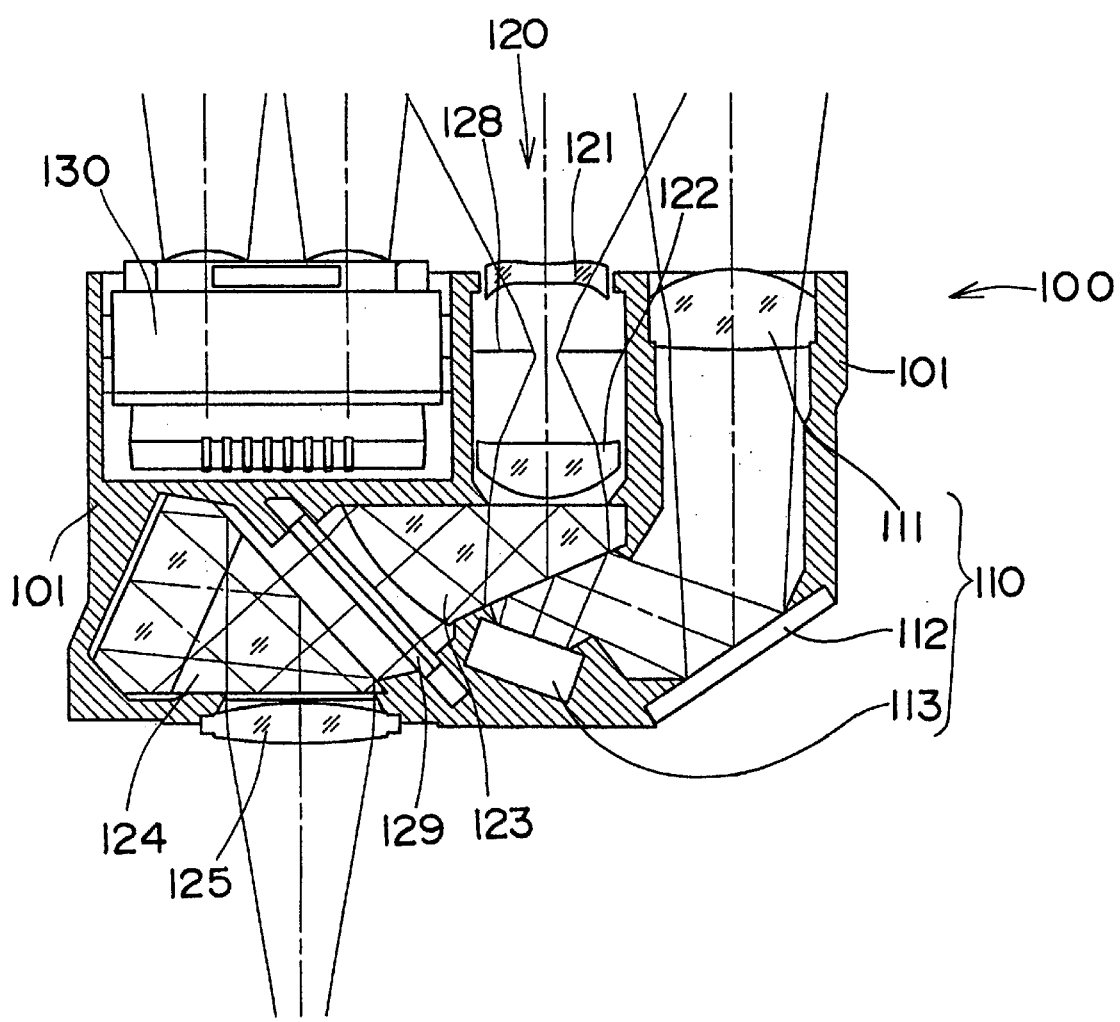
FIG. 5 is a cross section of an optical unit of a camera, as an optical apparatus, according to a first embodiment of the present invention.

FIG. 5 shows a cross section of a main part of the optical unit 100 of the camera. The optical unit 100 has an AE optical system 110, a finder optical system 120, and a passive AF unit 130, which are integrally arranged in an unit body 101.

Figure 6:
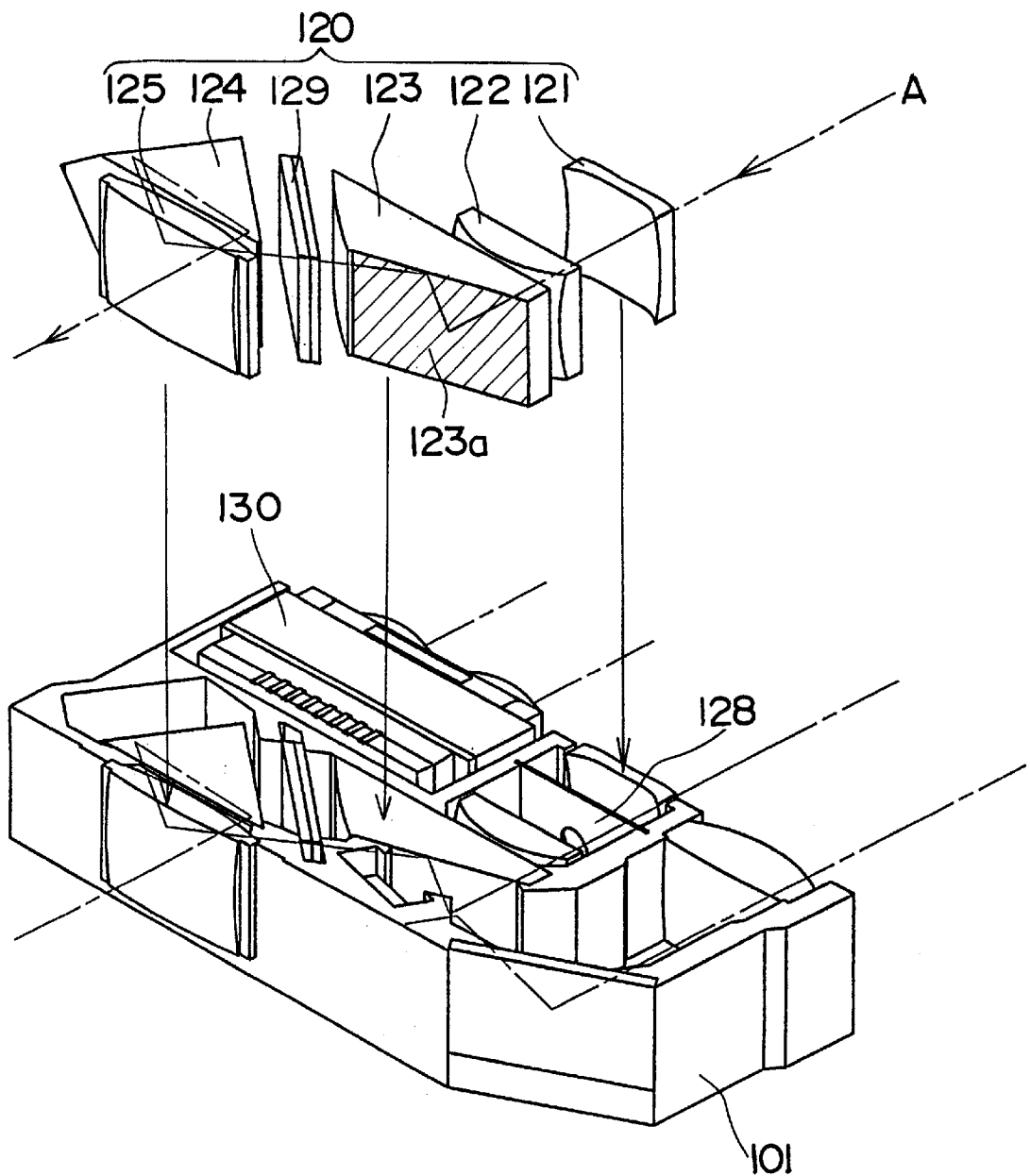
FIG. 6 is a perspective view showing a unit body of the optical unit and a finder optical system therein shown in FIG. 5.

For a better understanding of FIG. 5, the unit body 101 and the finder optical system 120 are shown in FIG. 6 which is a perspective view thereof FIG. 6 shows an assembled state in which the finder optical system 120 is assembled to the unit body 101, and it also shows a taken-out state in which the finder optical system 120 is taken out from the unit body 101. Meanwhile, FIG. 7, which is a perspective view, shows the unit body 101, the AE optical system 110, and the passive AE unit 130. In FIG. 7, although the finder optical system 120 is not shown, a first prism 123 which forms a part of the finder optical system 120 is shown, because an aluminum deposited film (or an aluminum deposited layer) is provided on a surface 123a of the first prism 123, and the surface 123a not only forms the part of the finder optical system 120, but also forms a part of the AE optical system 110.

Figure 7:
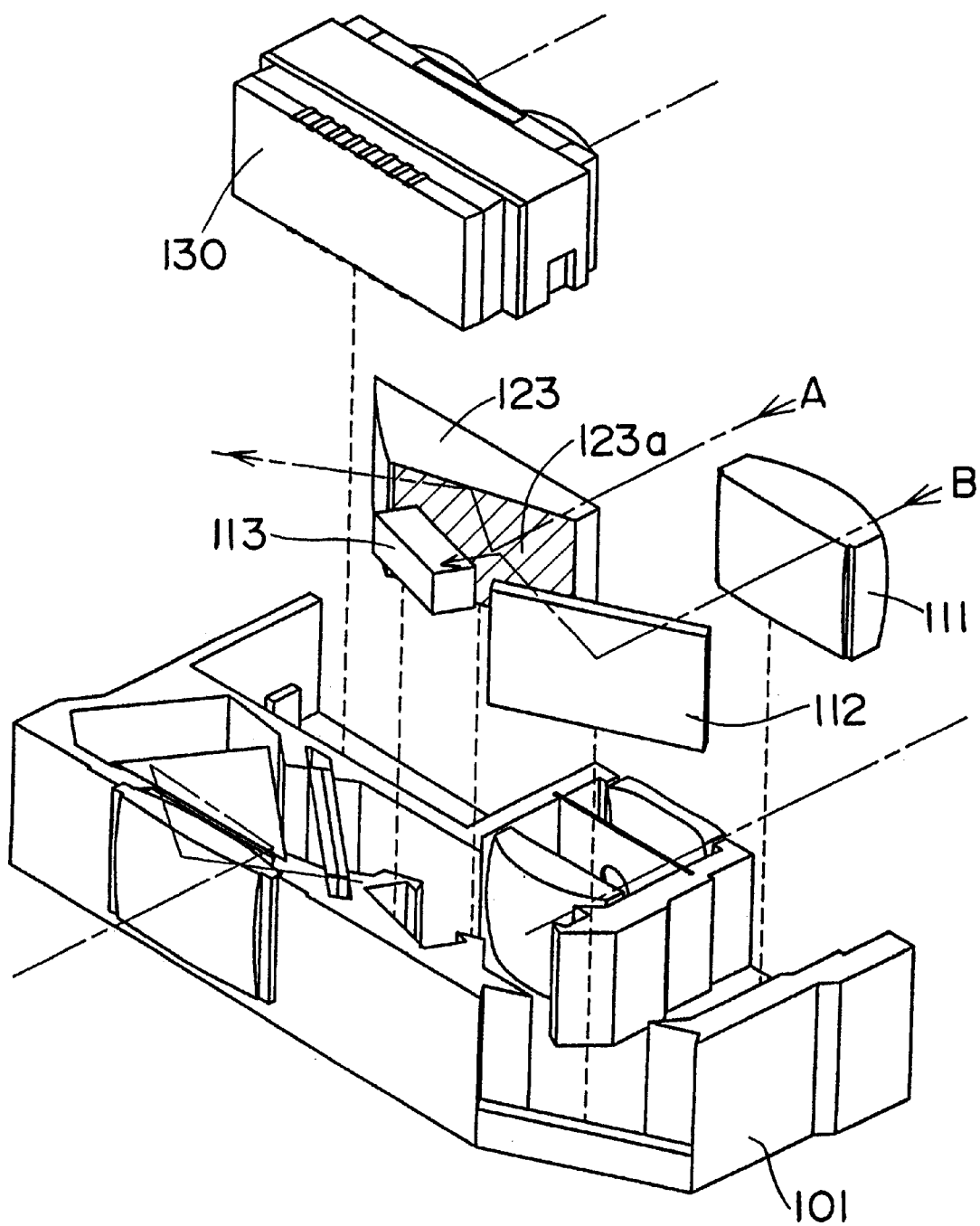
FIG. 7 is a perspective view showing the unit body and an AE optical system therein shown in FIG. 5.

In FIG. 7, an optical path in the finder optical system 120 is shown by a dashed line "A", and an optical path in the AE optical system 110 is shown by a dashed line "B". It can be understood that the light along the optical path "B" in the AE optical system 110 is totally reflected on an exposed side (i.e. an outer side) of the aluminum film deposited surface 123a of the first prism 123 which is a component of the finder optical system 120. In this arrangement, a back side (i.e. inner side) of the aluminum film deposited surface 123a is employed as a total reflecting surface in the finder optical system 120.

The aluminum deposited film itself has been conventionally well known, and it is made, or formed, by depositing aluminum by vacuum evaporation on a surface of a body of a prism. Different from a conventional art, however, both sides (i.e. outer side and inner side) of the aluminum film deposited surface 123a are employed as reflecting surfaces.

In this specification, the exposed side (i.e. the outer side) of the aluminum film deposited surface 123a is a face of the aluminum film which is open, or exposed, to environment, and the back side (i.e. the inner side) of the aluminum film deposited surface 123a is a face of the aluminum film which contacts with an outer surface of a body of a prism. In FIG. 7, the surface on which the ray indicated by the arrow "B" falls, is the exposed side of the aluminum film deposited surface 123a; on the other hand, the surface on which the ray indicated by the arrow "A" falls, is the back side thereof. Namely, there exist a pair of reflecting surfaces per a surface of the prism, which is the aluminum film deposited surface 123a in the first embodiment.

As shown in FIGS. 5 and 6, the finder optical system 120 has a first objective lens 121, a second objective lens 122, the first prism 123, a second prism 124, and an eye piece lens 125. Further, there is arranged a finder diaphragm 128 which is located between the first objective lens 121 and the second objective lens 122. Still further, there is arranged a field pointing frame 129 which is located between the first prism 123 and the second prism 124.

Meanwhile, the AE optical system 110 has a light receiving lens 111, a reflex mirror 112, and a photo sensor 113, as shown in FIG. 7.

Next, with reference to FIG. 8, the description is made below upon the camera with the optical unit according to a second embodiment of the present invention.

Figure 8:
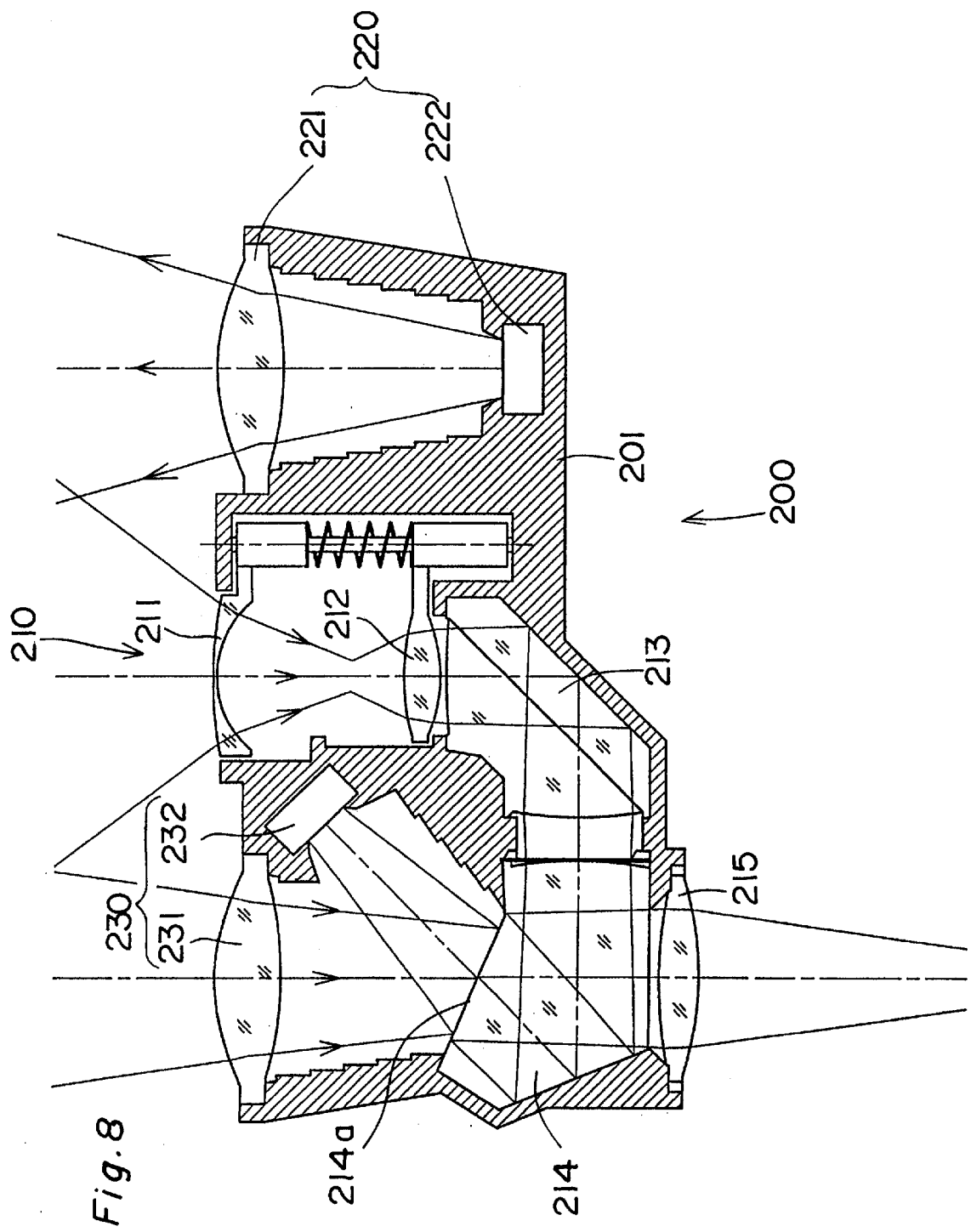
FIG. 8 is a cross section of an optical unit of the camera, as the optical apparatus, according to a second embodiment of the present invention.

That is, FIG. 8 shows a cross section of a main part of the optical unit 200 of the camera. In the optical unit 200, a light projecting, or emitting, optical system 220 and a light receiving optical system 230 of an active AF system are arranged on both sides of a unit body 201. A finder optical system 210 is arranged between the light projecting optical system 220 and the light receiving optical system 230.

The light projecting optical system 220 has a light projecting, or emitting, lens 221 and a light projecting, or emitting, element 222. The light receiving optical system 230 has a light receiving lens 231 and a photo sensor (or a light receiving element) 232. The finder optical system 210 has a first objective lens 211, a second objective lens 212, a first prism 213, a second prism 214, and an eye piece lens 215. Although each prism shown in FIG. 8 is formed by laminating some prism pieces, a prism integrally made of one single piece can also be employed.

In the second embodiment shown in FIG. 8, an aluminum deposited film is provided on a surface 214a of the second prism 214 of the finder optical system 210. On an outer side of the film deposited surface 214a, the light travelling in the light receiving optical system 230 totally reflects towards the photo sensor 232. On the other hand, on an inner side of the film deposited surface 214a, the light travelling in the finder optical system 210 totally reflects towards the eyepiece lens 215.

According to the second embodiment, the focal length in the active AF system is possible to be longer while the optical unit is compact; therefore, an accuracy in focussing is enhanced.

Next, with reference to FIG. 9, the description is made below upon the camera with the optical unit according to a third embodiment of the present invention.

Figure 9:
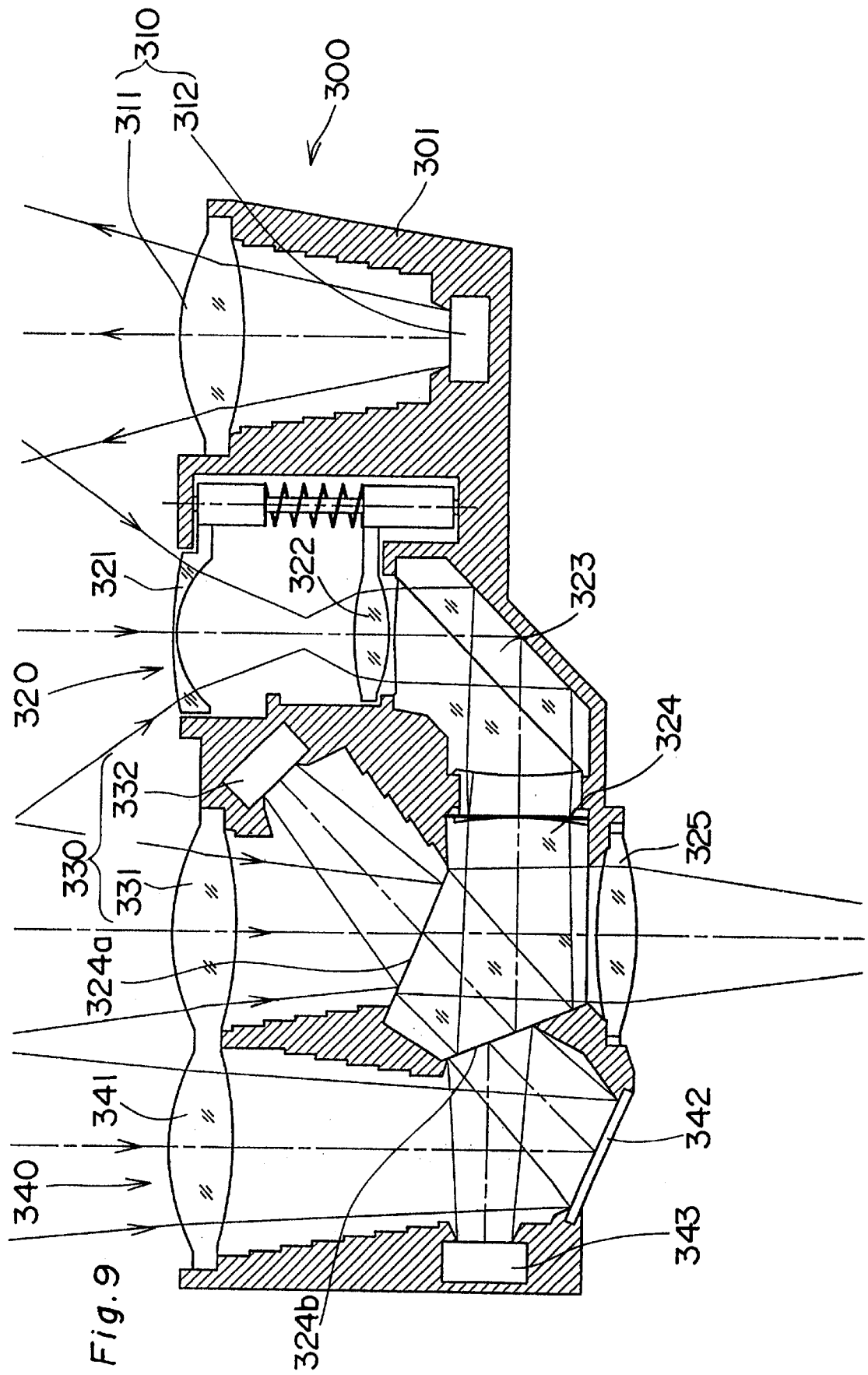
FIG. 9 is a cross section of an optical unit of the camera, as the optical apparatus, according to a third embodiment of the present invention.

That is, FIG. 9 shows a cross section of a main part of the optical unit 300 of the camera. In the optical unit 300, a light projecting optical system 310 and a light receiving optical system 340 of an active AF system are arranged on both sides of a unit body 301. There is arranged a finder optical system 320 which is located between the light projecting optical system 310 and the light receiving optical system 340 and which is located closer to the light projecting optical system 310 rather than to the light receiving optical system 340. There is also arranged an AE optical system 330 which is located between the light projecting optical system 310 and the light receiving optical system 340 and which is located closer to the light receiving optical system 340 rather than to the light projecting optical system 310.

The reason why the light projecting optical system 310 and the light receiving optical system 340 are located with a maximum space therebetween, is to make the longest a distance therebetween in a base length direction which is perpendicular to a direction (i.e. a reference length: refer to FIG. 1) of its optical axis. With this arrangement, it is possible to enhance a precision of the AF operation of the camera.

The light projecting optical system 310 has a light projecting lens 311 and a light projecting element 312. The light receiving optical system 340 has a light receiving lens 341, a reflex mirror 342, and a photo sensor 343. The finder optical system 320 has a first objective lens 321, a second objective lens 322, a first prism 323, a second prism 324, and an eye piece lens 325. The AE optical system 330 has a light receiving lens 331 and a photo sensor 332. Although each prism shown in FIG. 9 is formed by laminating some prism pieces, a prism integrally made of one single piece can also be employed.

In the third embodiment shown in FIG. 9, a pair of aluminum film deposited surfaces 324a, 324b are formed on the second prism 324 of the finder optical system 320. That is, the light travelling in the AE optical system 330 totally reflects on the outer side of one 324a of pair of the aluminum film deposited surfaces towards the photo sensor 332; the light travelling in the finder optical system 320 totally reflects on the inner side of the other 324b of the pair of the aluminum film deposited surfaces and then on the inner side of the one 324a of the pair of aluminum film deposited surfaces towards the eye piece lens 325; and the light travelling in the light receiving optical system 340 totally reflects on the reflex mirror 342 and then on the outer side of the other 324b of the pair of aluminum film deposited surfaces towards the photo sensor 343.

As can be understood from this third embodiment, a pair of additional reflecting surfaces are available by providing the two aluminum film deposited surfaces, different from the conventional arrangement. Therefore, it is preferable that the film deposited surfaces are provided as many as possible.

According to the third embodiment, the focal length in the AE optical system is possible to be longer while the optical unit is compact; therefore, it is possible to realize a spot photometric measurement even in a zoom photographing with a higher magnification.

Next, with reference to FIG. 10, the description is made below upon the camera with the optical unit according to a fourth embodiment of the present invention.

Figure 10:
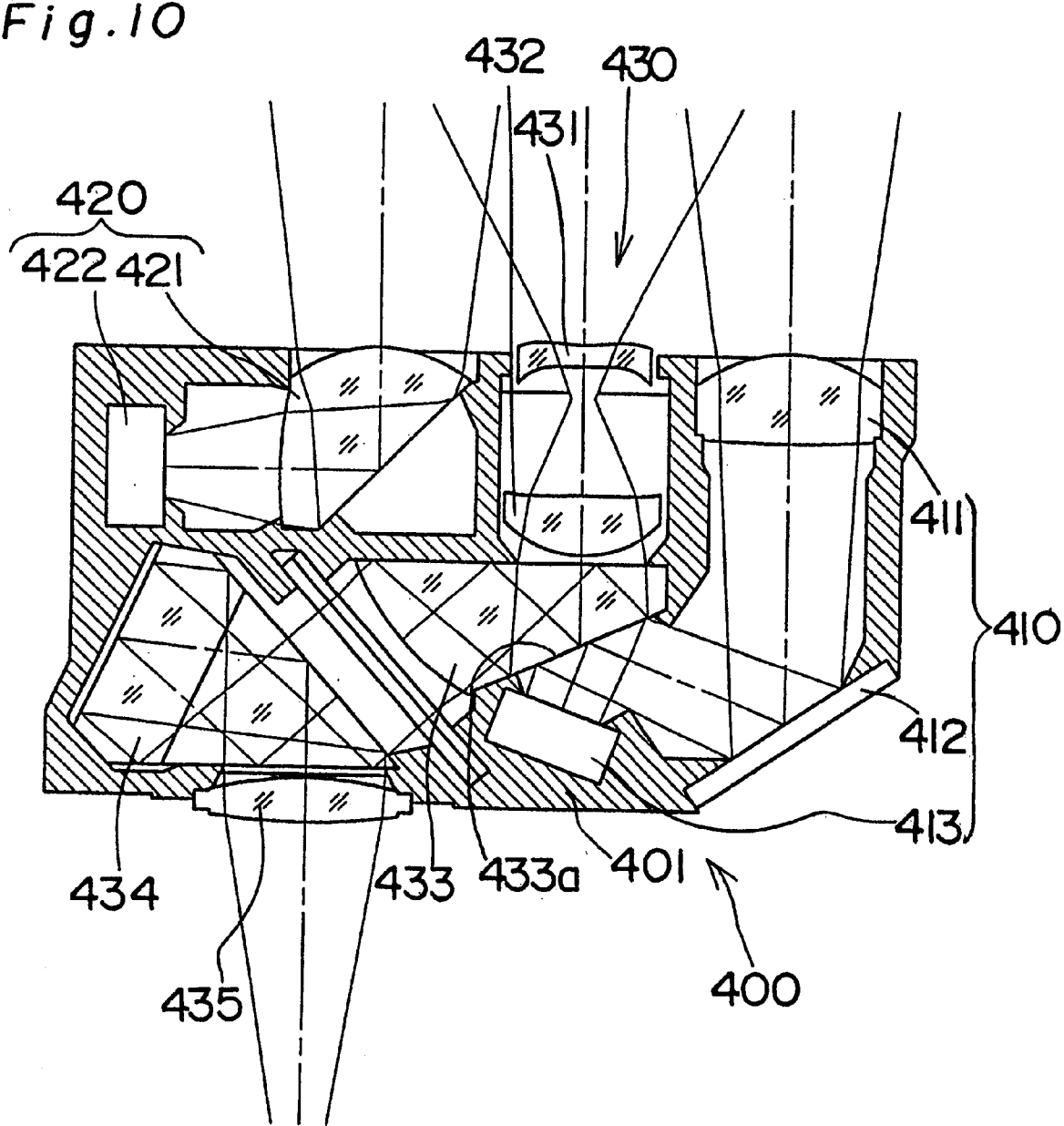
FIG. 10 is a cross section of an optical unit of the camera, as the optical apparatus, according to a fourth embodiment of the present invention.

That is, FIG. 10 shows a cross section of a main part of the optical unit 400 of the camera. In the optical unit 400, a light projecting optical system 410 and a light receiving optical system 420 of an active AF system are arranged on both sides of a unit body 401. A finder optical system 430 is arranged between the light projecting optical system 410 and the light receiving optical system 420.

The light projecting optical system 410 has a light projecting lens 411, a reflex mirror 412, and a light projecting element 413. The light receiving optical system 420 has a light receiving lens 420 and a photo sensor 422. The finder optical system 430 has a first objective lens 431, a second objective lens 432, a first prism 433, a second prism 434, and an eye piece lens 435.

In the fourth embodiment shown in FIG. 10, an aluminum deposited film is provided on a surface 433a of the first prism 433 of the finder optical system 430 by vacuum evaporation. On an outer side of the film deposited surface 433a, the light travelling in the light projecting optical system 410 totally reflects. On an inner side of the film deposited surface 433a, the light travelling in the finder optical system 430 totally reflects.

Next, with reference to FIG. 11, the description is made below upon the camera with the optical unit according to a fifth embodiment of the present invention.

Figure 11:
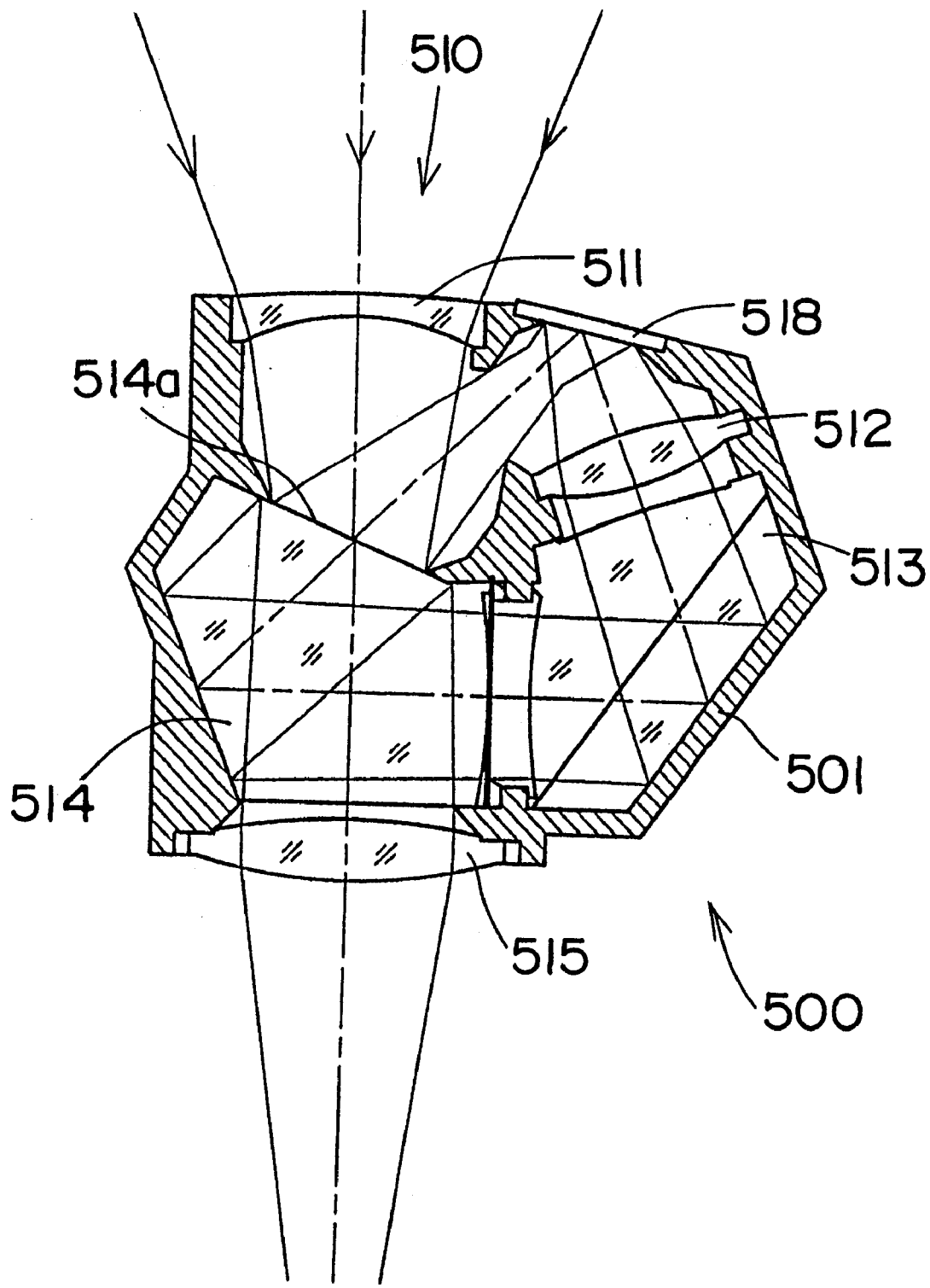
FIG. 11 is a cross section of an optical unit of the camera, as the optical apparatus, according to a fifth embodiment of the present invention.

That is, FIG. 11 shows a cross section of a main part of the optical unit 500 of the camera. In the optical unit 500, a unit body 501 carries only a finder optical system 510. This finder optical system 510 has a first objective lens 511, a second objective lens 512, a first prism 513, a second prism 514, an eye piece lens 515, and a reflex mirror 518.

In the fifth embodiment, an aluminum deposited film is formed on a surface 514a of the second prism 514 of the finder optical system. Both of an outer side of the aluminum film deposited surface 514a and an inner side thereof serve as total reflecting surfaces in the finder optical system 510 as one optical system. That is, the aforementioned embodiments (i.e. the first through fourth embodiments) are different from this fifth embodiment in that the outer side and the inner side of each reflection member in the aforementioned embodiments serve as different reflecting surfaces in different optical systems. However, through all the aforementioned embodiments (i.e. the first through fifth embodiments), the reflection member has the same effect in that the optical path in each optical system can be made longer with it.

Next, with reference to FIG. 12, the description is made below upon the camera with the optical unit according to a sixth embodiment of the present invention.

Figure 12:
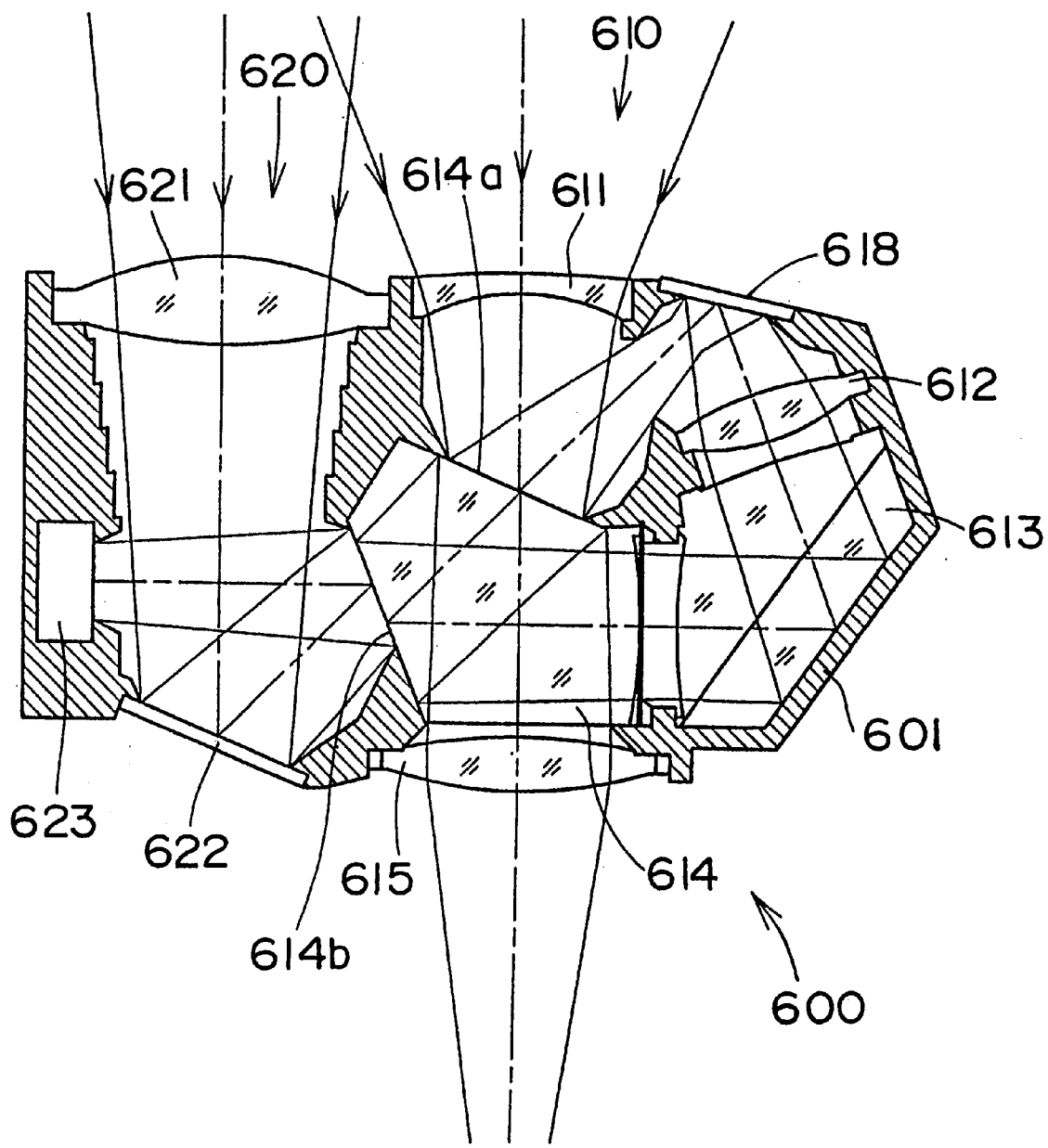
FIG. 12 is a cross section of an optical unit of the camera, as the optical apparatus, according to a sixth embodiment of the present invention.

That is, FIG. 12 shows a cross section of a main part of the optical unit 600 of the camera. In the optical unit 600, a unit body 601 carries a finder optical system 610 and an AE optical system 620. The finder optical system 610 has a first objective lens 611, a second objective lens 612, a first prism 613, a second prism 614, an eye piece lens 615, and a reflex mirror 618. The AE optical system 620 has a light receiving lens 621, a reflex mirror 622, and a photo sensor 623.

In the embodiment shown in FIG. 12, a pair of reflection surfaces 614a, 614b are formed, like in the third embodiment shown in FIG. 9. The two reflection surfaces 614a, 614b have aluminum deposited films which are formed on different surfaces of the second prism 614 of the finder optical system 610. The light travelling in the finder optical system 610 totally reflects on an outer side of one 614a of the pair of film deposited surfaces 614a, 614b, then the reflected light is further reflected on an inner side of the other 614b of the pair of film deposited surfaces, and then the reflected light is further reflected on an inner side of the one 614a of the pair of film deposited surfaces towards the eye piece lens 615. Meanwhile, the light travelling in the AE optical system 620 totally reflects on an outer side of the other 614b of the pair of film deposited surfaces.

In each of the above embodiments, the present invention is applied to a camera in which there is provided a finder (or viewfinder), independently of a photographing lens. However, it is needless to say that the present invention may be applied to a single-lens reflex camera. Also, it is needless to say that the present invention may be applied to any optical apparatus other than the camera. Next, with reference to FIG. 13, the description is made below upon a binocular telescope, as the optical apparatus, with the optical unit, as a seventh embodiment, to which the present invention is applied.

Figure 13:
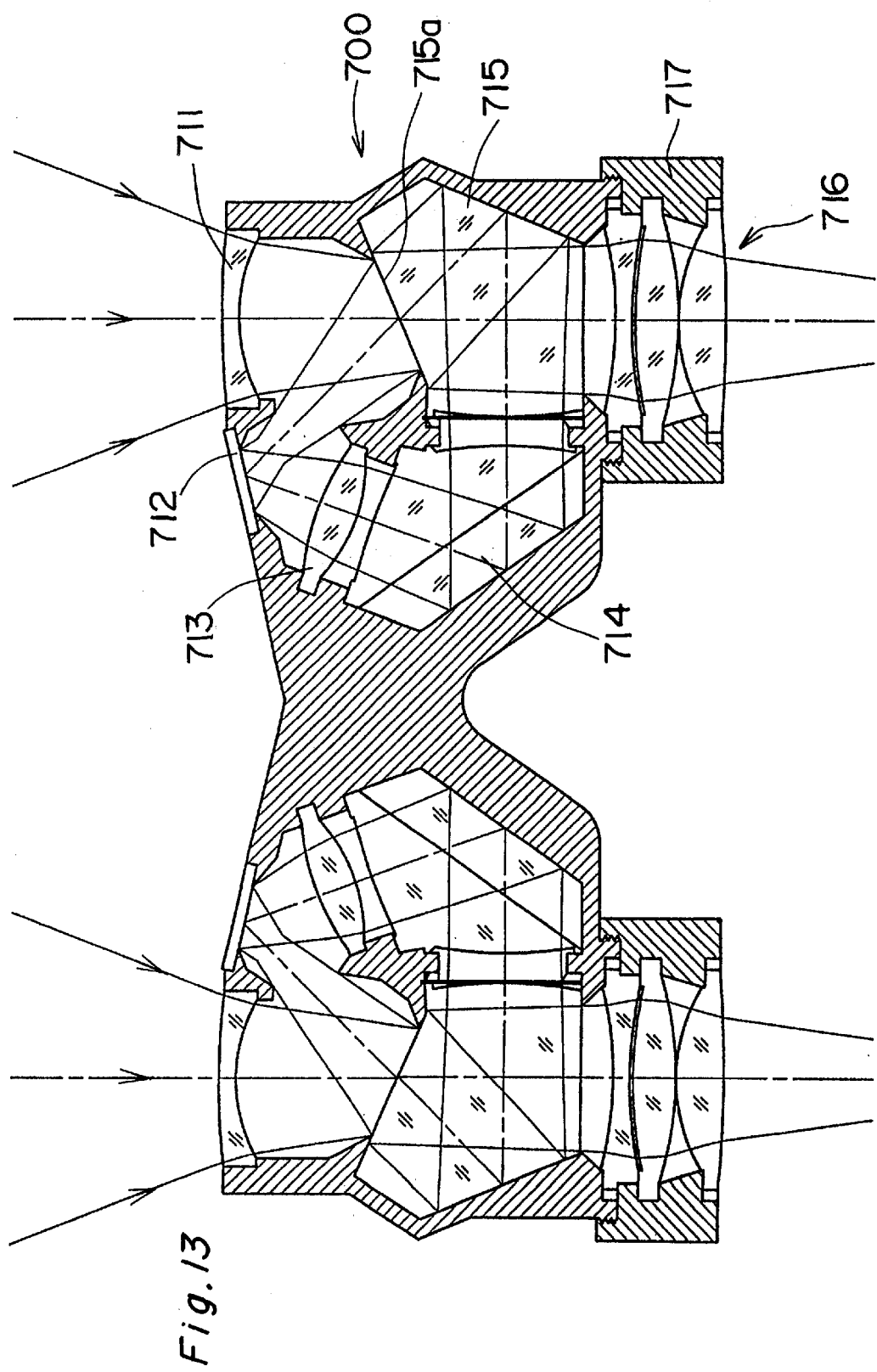
FIG. 13 is a cross section of an optical unit of a binocular telescope, as the optical apparatus, according to a seventh embodiment of the present invention.

That is, FIG. 13 shows a schematic cross section of the binocular telescope 700. A pair of optical systems thereof are arranged on both sides (i.e. a right side and a left side in the figure) in a relation of a mirror image with each other, relative to a center of a body of the binocular telescope. Therefore, an explanation thereof is made upon a right-hand optical system only.

The optical system has a first objective lens 711, a reflex mirror (or a reflection mirror) 712, a second objective lens 713, a first prism 714, a second prism 715, and a group of eye piece lenses 716. A holder 717 which holds the group of eye piece lenses 716, is rotatably mounted on the body of the binocular telescope 700, and it allows to perform a focussing operation.

In the embodiment shown in FIG. 13, an aluminum deposited film is formed on a surface 715a of the second prism 715. The light travelling, or passing, in the optical system totally reflects on the outer side of the film deposited surface 715a, and on the inner side thereof. Namely, the deposited film is employed to ensure a long optical path through which the light passes. The long optical path forming in the optical system, makes it possible to realize a high magnification.

Although the present invention has been fully described in connection with the preferred embodiments thereof with reference to the accompanying drawings, it is to be noted that various changes and modifications are also apparent to those skilled in the art. The essence of the present invention is that the exposed side (i.e. outer side) of one surface of a prism and the back side (i.e. inner side) thereof are made use of as reflection surfaces. For example, in the aforementioned embodiments, the aluminum deposited film is employed. Alternatively, the deposited film may be made of Ag (silver), Cr (chromium), Cu (copper), Au (gold), or the like, instead of employing the aluminum (Al).

Alternatively, the deposited film or layer may be made as a dielectric multi-layered deposition film or layer.

Further, instead of employing the deposited film or layer, a plate-like reflex mirror, both surfaces of which serve as reflection surfaces, may be employed.

Such changes and modifications are to be understood as included within the scope of the present invention as defined by the appended claims unless they depart therefrom.

What id claimed is:

1. An optical apparatus having a prism and at least one optical element, the prism comprising:
   a first surface through which an incident light passes into a body of the prism;
   a second surface having an inner side by which the incident light is reflected into a reflection light within the body; and
   a third surface through which the reflection light is projected outside the body,
   wherein the prism is arranged such that an outer side of the second surface reflects light, that is travelling inside the optical apparatus and is incident upon the outer side of the second surface, outwardly from the prism to the at least one optical element.

2. An optical apparatus as claimed in claim 1, wherein the second surface is provided with a metal deposited film which is deposited on the body of the prism.

3. An optical apparatus as claimed in claim 1, wherein the prism is one of a plurality of components which constitute a finder optical system.

4. An optical apparatus as claimed in claim 1, wherein the outer side of the second surface is employed as a reflection surface which is one of a plurality of components constituting an active measuring system for automatic focusing.

5. An optical apparatus as claimed in claim 1, wherein the outer side of the second surface is employed as a reflection surface which is one of a plurality of components constituting a photometering system for automatic exposure.

6. An optical apparatus as claimed in claim 1, wherein both the inner side and the outer side of the second surface are employed as a pair of reflection surfaces within a same optical system.

7. An optical apparatus according to claim 1, wherein the optical element to which light from the outer side of the surface of the prism is reflected is an element in an image observing system for observing an image.

8. An optical apparatus according to claim 1, wherein the optical element to which light from the outer side of the second surface of the prism is reflected is a sensor.

9. An optical apparatus according to claim 1, wherein the prism reflects light, that was once reflected by the inner side of the second surface of the prism, with the outer side of the second surface of the prism, and the prism reflects light, that was once reflected by the outer side of the second surface of the prism, with the inner side of the second surface of the prism.

10. An optical apparatus with an optical element, the optical element comprising:
    a first surface having a first inner side and a first outer side; and
    a second surface having a second inner side and a second outer side,
    wherein an incident light which passes into a body of the optical element is reflected by the first inner side of the first surface and the second inner side of the second surface into a reflection light which is projected outside the body, and
    wherein each of the first outer side of the first surface and the second outer side of the second surface reflects light, that is travelling inside the optical apparatus and is incident on the outer side of the first surface and the outer side of the second surface, outwardly from the optical element.

11. An optical apparatus as claimed in claim 10, wherein each of the first surface and the second surface is provided with a metal deposited film which is deposited on the body of the optical element.

12. An optical apparatus as claimed in claim 10, wherein the optical element is one of a plurality of components which constitute a finder optical system.

13. An optical apparatus as claimed in claim 10, wherein at least one of the first outer side and the second outer side is employed as a reflection surface which is one of a plurality of components constituting an active measuring system for automatic focusing.

14. An optical apparatus as claimed in claim 10, wherein at least one of the first outer side and the second outer side is employed as a reflection surface which is one of a plurality of components constituting a photometering system for automatic exposure.

15. An optical apparatus as claimed in claim 10, wherein the first inner side, the second inner side, and at least one of the first outer side and the second outer side, are employed as reflection surfaces within a same optical system.

16. An optical apparatus according to claim 10, further comprising a second optical element, wherein light that is reflected by at least one of the first outer side of the first surface and the second outer side of the second surface is directed toward the second optical element.

17. An optical apparatus having a prism and at least one optical element, the prism comprising:
    a first surface through which an incident light passes into a body of the prism; and
    a second surface having an inner side and an outer side;
    wherein the incident light which passes through said first surface is reflected into a reflection light within the body by the inner side of said second surface, and
    wherein the outer side of said second surface reflects light, that is travelling inside the optical apparatus and is incident on the outer side of said second surface, outwardly from the prism to the at least one optical element.

18. An optical apparatus according to claim 17, wherein the optical element to which light from the outer side of the surface of the prism is reflected is an element in an image observing system for observing an image.

19. An optical apparatus according to claim 17, wherein the optical element to which light from the outer side of the second surface of the prism is reflected is a sensor.

20. An optical apparatus according to claim 17, wherein the prism reflects light, that was once reflected by the inner side of the second surface of the prism, with the outer side of the second surface of the prism, and the prism reflects light, that was once reflected by the outer side of the second surface of the prism, with the inner side of the second surface of the prism.

* * * * *